United States Patent [19]

Cooper et al.

[11] Patent Number: 4,689,076

[45] Date of Patent: Aug. 25, 1987

[54] METHOD OF OPERATING METALLURGICAL FURNACE AND A METALLURGICAL FURNACE APPARATUS

[75] Inventors: James Cooper; Robert K. Watson, both of Glasgow, Scotland

[73] Assignee: James Howden & Company Limited, Glasgow, Scotland

[21] Appl. No.: 733,510

[22] Filed: May 10, 1985

[30] Foreign Application Priority Data

May 11, 1984 [EP] European Pat. Off. ........ 84303232.7
Jan. 21, 1985 [GB] United Kingdom ................ 8501431

[51] Int. Cl.⁴ ........................... C21B 5/00; C21B 7/00; C21B 13/12; F27D 11/08
[52] U.S. Cl. ....................................... 75/10.61; 75/42; 266/182; 373/79
[58] Field of Search ........................ 75/41, 42, 10.61; 241/1, 39; 266/137, 176, 182, 221, 267; 373/79

[56] References Cited

U.S. PATENT DOCUMENTS

| | | | |
|---|---|---|---|
| 2,385,508 | 9/1945 | Hammond | 241/39 |
| 3,150,962 | 9/1964 | Pearson | 75/42 |
| 4,412,858 | 11/1983 | Viramontes-Brown et al. | 75/38 |

*Primary Examiner*—Melvyn J. Andrews
*Attorney, Agent, or Firm*—Barnes & Thornburg

[57] ABSTRACT

A method of operating a metallurgical furnace, and a furnace apparatus capable of using this method, in which coal is pulverized in a pulverizer vessel by interparticle collisions in at least one stream of gaseous medium, to produce ultrafine pulverized coal and feeding a mixture of the ultrafine pulverized coal and gaseous medium directly and continuously from the pulverizer vessel to the metallurgical furnace.

11 Claims, 3 Drawing Figures

METHOD OF OPERATING METALLURGICAL FURNACE AND A METALLURGICAL FURNACE APPARATUS

The present invention relates to a method of operating a metallurgical furnace and a metallurgical furnace apparatus.

At the present time, blast furnaces for the production of pig iron are charged from the top with burden material consisting of iron, as ore, sinter or pellets, coke and fluxes. One of the primary limitations placed upon blast furnace throughput is the furnace working volume and, if the quantity of coke being charged can be reduced by introducing coal at the tuyere, this effectively frees more of the working volume for iron bearing material and so allowing for higher output. In particular, skip charged furnaces which at present have a limit on the charge rate, benefit from having to handle less coke.

In recent years several attempts have been made to fire crushed or pulverized coal through the tuyeres of the blast furnace. By this technique, up to 20% or even more of the coke charge can be replaced by coal injection, thus allowing higher production rates, reduced fuel costs and improved top gas credits.

One such structure is illustrated in U.S. Pat. No. 3,150,962. Such a construction is relatively complex and involves the use of a gravity operated separator in which pulverized coal deposits in the lower part of a hopper from which it is then fed into the tuyeres of the furnace via a rotary valve. Experience has shown that rotary valves can be exceedingly troublesome in operation and require a considerable amount of servicing and maintenance. The pulverizer itself is a mechanical pulverizer with moving components again with the inherent servicing requirements.

However, there are both technical and economic problems associated with such proposals to convert blast furnaces to partial coal firing at the tuyeres. The production of pulverized coal requires large mechanical pulverizers with very heavy moving parts. The high maintenance requirements of these mills and the need for substantial foundations to withstand mechanical vibrations, preclude their installation in the area of the steel mill close to the furnace. This is a hazardous area where it is preferred to keep access of personnel to a minimum. Consequently, the pulverizer must be positioned a significant distance away from the blast furnace and requires long lengths of distribution pipework. In addition, most alternative arrangements have required the use of bin and feeder type systems with the accompanying requirement for large inerting systems to prevent the bin and feeder arrangements becoming hazardous.

It is now proposed, according to the present invention, that the fuel is pulverized in a pulverizer vessel by interparticle collision in at least one stream of gaseous medium introduced into the pulverizer at a pressure significantly in excess of pressure existing in the metallurgical furnace, that the fuel is pulverized to an ultrafine particle size in said pulverizer vessel and that the ultrafine pulverized fuel is fed directly and continuously from the pulverizer vessel to the furnace solely under the action of said gaseous medium.

Using a pulverizer employing interparticle collisions induced by gaseous streams, enables a high throughput capacity to be achieved with extremely low erosion rate. The pulverizers of the type mentioned, have a low maintenance requirement because the curtains of gaseous medium carrying coal to be pulverized protect the walls of the pulverizer vessel from erosion. Futhermore, pulverizers of this general type can be installed in the area local to the furnace because the pulverizers themselves do not have the problems of vibration inherent with conventional mechanical pulverizers. This consequently significantly reduces the length of pneumatic coal delivery pipework required and thereby reduces expense and also further maintenance.

It will be appreciated that using a pulverizer of the type proposed according to the invention, there are no moving parts and therefore no servicing requirements. By employing a pressure in the pulverizer vessel in the pulverizer of, say, 3 to 3.5 bar or more, which is significantly above the pressure within the furnace, which is usually of the order of 2 to 2.5 bar, no other means have to be provided to transport the ultrafine fuel into the furnace.

Because of the low wear characteristics of ultrafine pulverized coal, it is possible to allow high pipeline velocities which permits he possibility of accommodating the transport fluid in small diameter pipelines, for example of 19 to 38 millimeter diameter, so that existing pipelines which have been provided for oil as a supplementary fuel can be utilized.

In one way of carrying out the method the ultrafine pulverized fuel and gaseous medium are fed directly and continuously from the pulverizer via the tuyeres of the furnace.

The gaseous medium may be in the form of steam which is also used to provide blast humidification in the metallurgical furnace. This can significantly save the requirement for introducing water at another place for this humidification.

In an alternative arrangement, the gaseous medium is a mixture of compressed air and steam, sufficient steam being used to cause partial drying and pulverizing as well as blast humidification, and the compressed air supply is used as a supplement to the steam to provide additional energy requirements for coal drying and pulverizing.

In a further arrangement, the gaseous medium may be compressed, heated air and the necessary blast humidification can be provided by separate means.

It is also contemplated that the gaseous medium could be a compressed inert gas which is used for the total or partial drying of the pulverizing of the coal and this compressed inert gas can in fact be compressed furnace top gas from the furnace in question.

A centrifugal solid concentrator may be used between the pulverizer and the tuyeres of the furnace, to decrease the total volume of material flowing to the tuyeres to allow injection of the concentrated mixture through small bore injectors inserted in the tuyeres. By reducing the total volume of material flowing to the tuyeres, existing lance injectors which have been used for introducing oil as an alternative fuel can be employed to introduce the ultrafine fuel. Thus, existing furnaces can be modified at a relatively small expense.

The concentrator may include a clean gas outlet through which the gaseous medium extracted in the concentrator is passed and this can, for example, be fed to a location upstream of the tuyeres or directly to the furnace off gas cleaning system. The off gas is often recycled and any particles of coal introduced at this stage could be burnt within the furnace.

In fact, because of the ability to use relatively small diameter pipelines, according to the present invention, one can use more gaseous medium so that the concentrator is very often not necessary. This further enables the design of the invention to be made simple and inexpensive and also to have very small repair or maintenance requirements.

It is also known to provide agitation in a metallurgical furnace by introducing an inert gas such as nitrogen or argon and to cause this flow into the molten metal at the foot of the furnace to bubble up through the molten metal and thereby cause the agitation. Such a system normally employs high pressure inert gas and a pressure valve to reduce this pressure to an acceptable level. Such furnaces usually employ a top feed for introducing coal as a reducing agent into the furnace and this in itself gives rise to substantial loss of the coal since it is simply blown out of the top of the furnace by the gases emanating therefrom.

It is now proposed, according to a further aspect of the invention, to provide a method of operating a metallurgical furnace including the steps of pulverizing solid fuel or other solid additive(s) in a pulverizer vessel by interparticle collision in at least one stream of inert gaseous medium, to produce an ultrafine pulverized product, running the metallurgical furnace so as to form a bath of molten metal in at least the lower part of the furnace andd introducing a mixture of ultrafine pulverized product and inert gaseous medium directly and continuously from the pulverizer vessel into the bath of molten metal, whereby the bath is agitated and the ultrafine pulverized product reacts with the molten metal.

This has several advantages. Firstly, by using the inert gas as the pulverizing gaseous medium, there is no need to use any other pulverizing gaseous medium and secondly, the act of carrying out the pulverizing in the pulverizer vessel effectively reduces the pressure in itself so that there is no need to provide any additional valves. The pulverized product is introduced directly into the molten bath where it can act very effectively and immediately as a reducing agent and there is substantially no loss of coal as in the prior known process, in which the coal is added at the top of the vessel. In other words, all of the coal is used in the production step and one does not have to use any more inert gas to carry out the pulverizing than would normally be used to carry out the stirring effect in the molten bath.

The invention also contemplates a metallurgical furnace apparatus comprising a main furnace chamber and means for feeding air or oxygen to the furnace, a pulverizer vessel means for feeding fuel to the pulverizer vessel, at least one nozzle for directing a stream of gaseous medium into the vessel to produce ultrafine pulverized coal in said vessel, and means for feeding the mixture of ultrafine pulverized coal and gaseous medium directly from the pulverizer vessel to the tuyeres.

In order that invention may more readily be understood, the following description is given, merely by way of example, reference being made to the accompanying drawings, in which.

Figure 1:
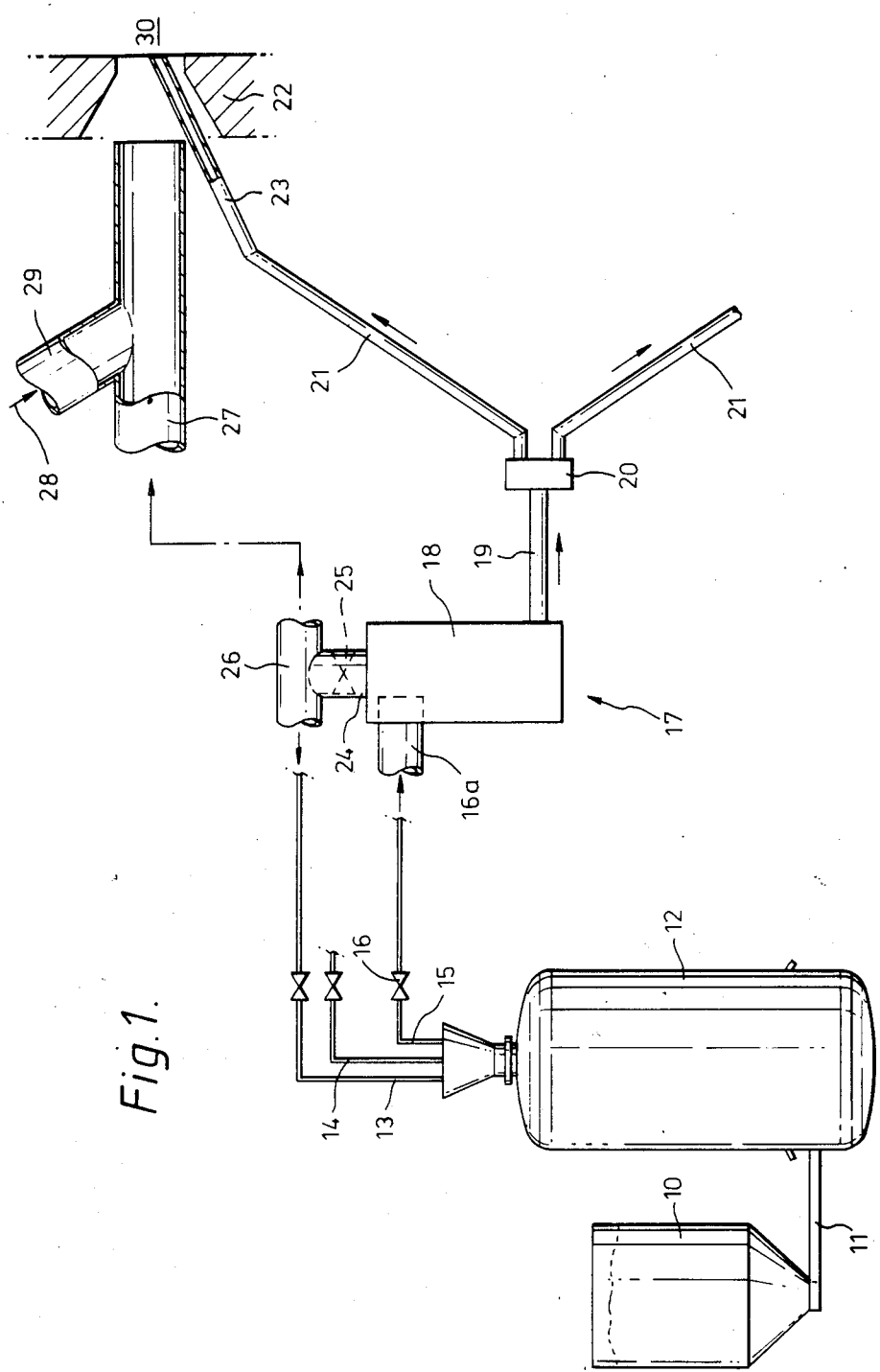
FIG. 1 is a schematic side elevation, partly in elevation, and with certain parts enlarged, of one embodiment of blast furnace apparatus according to the present invention.

Referring to the drawings, the apparatus illustrated comprises a feed coal bunker 10, from which coal with a top size of between 6 millimetres and 36 millimetres is fed via a feeder 11 to a pulverizer vessel 12. Superheated steam, compressed air or an inert gas, such as flue gas, or blast furnace off gas, is fed at an elevated temperature and at a pressure of 3 bar or preferably 3.5 bar or more to a plurality of nozzles, which are mounted in an annular array, with the nozzles each arranged to point upwardly and at an angle between a radius and a tangent to the annulus. Such an arrangement produces a significant amount of interparticle collision and the arrangement can be such that the particles which fall can be caused to provide a curtain thereby protecting the walls of the vessel from erosion by the action of the moving particles.

The pulverizer vessel 12 is shown with three outlet ducts 13, 14, 15, only one of which, duct 15, is shown being used according to the present invention. This duct passes via a discharge vessel 16 to a local distribution arrangement indicated by the general reference numeral 17. The purpose of this distribution arrangement is to deliver a concentrated coal and steam mixture into the zone of a blast furnace 30, which is local to tuyeres 22 of the blast furnace.

The mixture of pulverized coal and steam or gas enters a centrifugal concentrator 18, through a transition piece 16a, centrifugal action acting on the solids and gaseous flows within the concentrator produces separation and a much concentrated solid-gas mixture is directed from the concentrator via a solids outlet duct 19, which is of significantly smaller diameter than the outlet duct 15. The duct 19 leads to a two-way solids splitter 20, from which two even smaller diameter pipes 21 lead to injection pipes 23 in the tuyeres 22. For the sake of simplicity only one such tuyere is illustrated. The clean gas from the concentrator 18 exits via a gas outlet duct 24 and passes through a control valve 25, the purpose of which is to balance pressure drops between the outlet pipes 19 and 24.

The clean gas may then be passed through a simple two-way splitter 26 and connecting pipework to the hot air blast pipework 27 providing high temperature air to the two adjacent tuyeres. The hot blast air 28 to this blast air pipework is directed from the bustle main, (not shown) by a transfer duct 29 as is conventional in a blast furnace arrangement.

As an alternative, the clean gas may be fed from the valve 25 to a separate dust collector or to the venturi scrubber in the blast furnace top gas outlet duct. Any small quantities of uncollected coal samples in these collected solids are conventionally recycled into the furnace charge material, thus minimizing calorific value losses.

The illustrated processor would be supplying six adjacent tuyeres in a blast furnace and several coal processors would normally be used to supply coal to the blast furnace.

It will be appreciated that a significant number of changes can be made to the pipework to suit any particular construction of blast furnace. Moreover, while the foregoing description details coal injection into a blast furnace, for iron production, similar arrangements could equally be used for supplying coal to steel making plants, such as electric arc furnaces or BOS plant or to any other metallurgical furnace.

Figure 2:
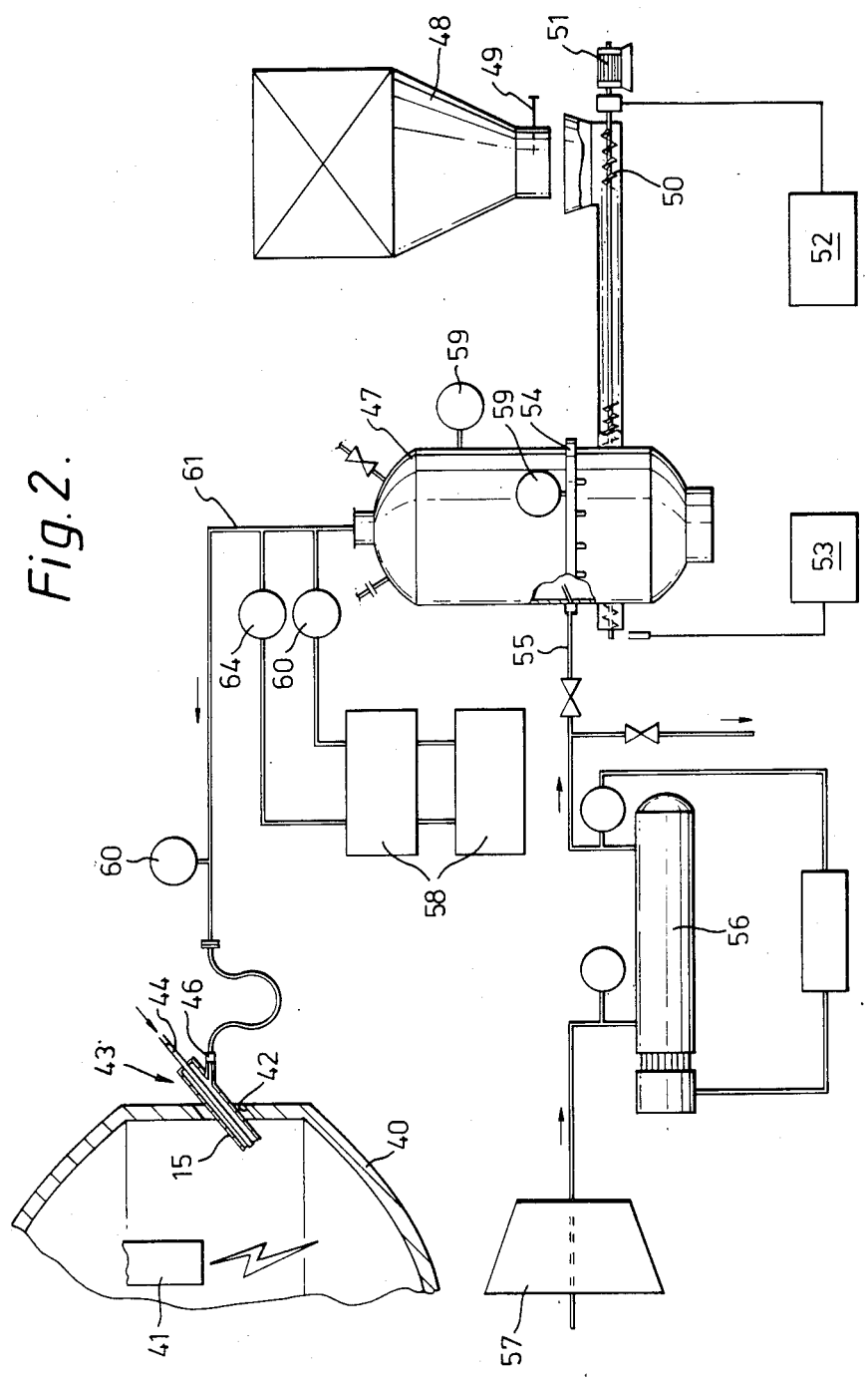
FIG. 2 is a schematic view of a second embodiment of apparatus for carrying out a method according to the invention.

Thus, referring now Referring to FIG. 2, there is illustrated therein an electric arc furnace (E.A.F.) although the same system could equally be used on any other form of furnace. The furnace itself comprises a furnace vessel 40 having an electrode 41 and a port 42 carrying a lance 43 of coaxial construction comprising a centre oxygen feeding core 49 and an outlet tube 45 forms an annular space therebetween, and including a tangential inlet 46 connected to the inner space.

A pulverizer vessel 47 has associated therewith a feed hopper 48 having a conventional slide plate 49 by means of which coal can be discharged into a screw feeder 50 connected to the lower part of the vessel. The screw feeder is provided with a drive motor 51 with the usual speed adjuster control 52 and speed detector 53. Somewhat below the centre of the vessel there is provided an annular feed manifold 54 having a multiplicity of inwardly extending nozzles 54A, each extending along a chord. Air is fed into the manifold 54 by means of a feedpipe 55 from a heater 56 which in turn is fed by a compressor 57.

The usual controls for the processor include an alarm arrangement 58 and pressure and temperature sensors 59, 60 at various points in the system.

The outlet to the pulverizer vessel 47 is in the form of a discharge tube 61 connected directly to the branch 46 of the nozzle 43.

In operation, coal is fed from the hopper 48 via the screwfeeder 50 to the lower part of the pulverizer vessel 47 and very high pressure air is injected through the nozzles mounted on the manifold 54 and produces a multiplicity of intersecting stream of air by means of which the coal is pulverized to an ultrafine state. The actual pulverizer vessel is generally similar to that disclosed in European Patent Publication No. 0017367. The resulting coal is pulverized to an average particle size usually of less than 10 microns. The generally fairly hot mixture of pulverized coal and air discharges along the discharge pipe 61 into the branch 46 of the nozzle 43 by means of which both the coal and the air as well as some additional oxygen are introduced into the furnace.

Figure 3:
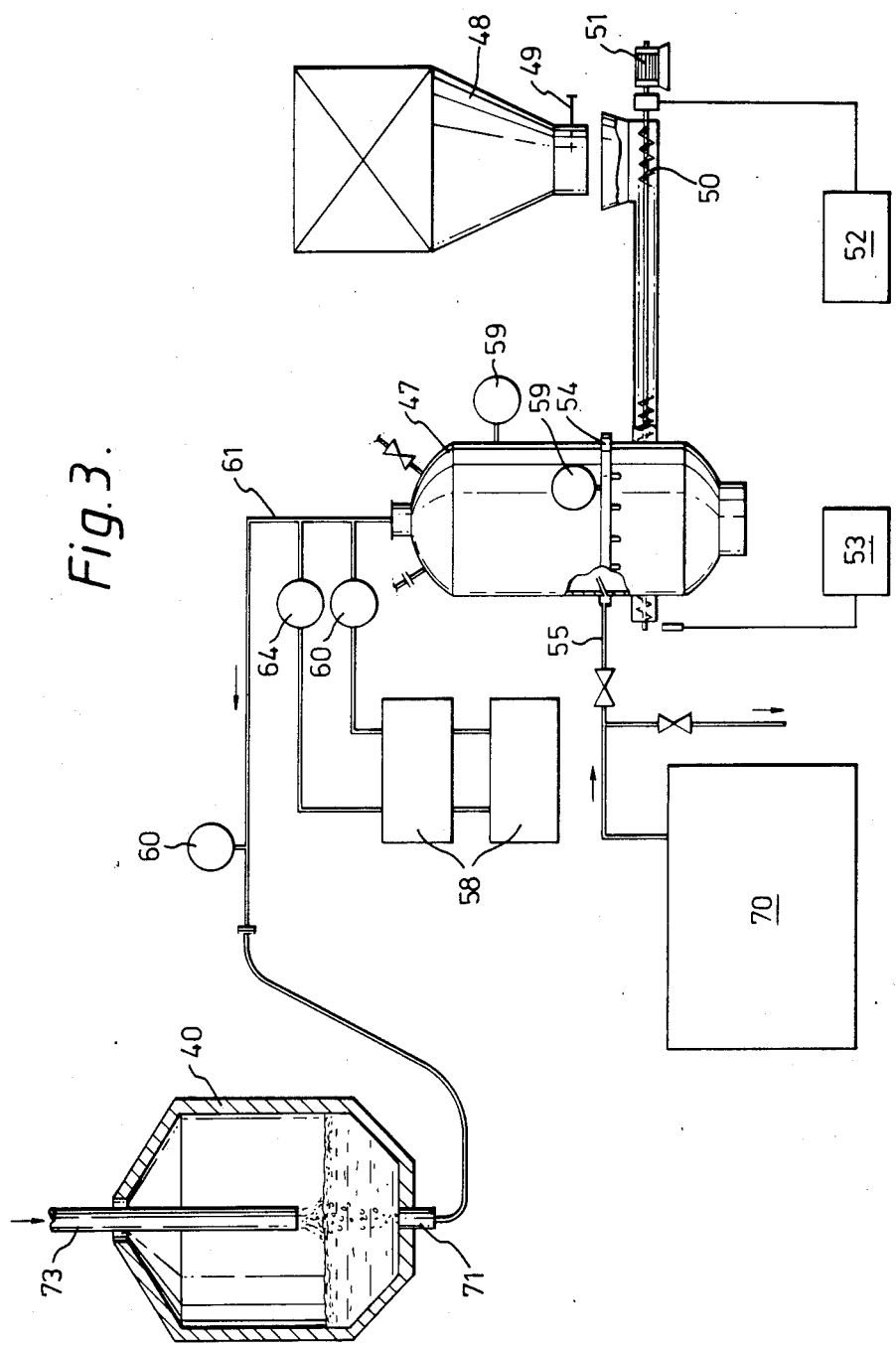
FIG. 3 is a similar view of a third apparatus for carrying out the of the invention.

The arrangement illustrated in FIG. 3 is generally similar and like parts have been indicated by like reference numerals. However, instead of having an air compressor, a container of high pressure inert gas, such as argon or nitrogen, is indicated at 70 and is used as the gaseous medium of pulverizing the coal. Again, instead of having a nozzle 43 to introduce oxygen as well as the pulverized coal and gaseous medium, a different type of nozzle 71 is shown by means of which the inert gas is introduced into the furnace at a level below the surface 72 of the molten metal shown in the furnace. This has the effect of allowing the inert gaseous medium to act as a stirring or agitating agent in the molten bath and of introducing, at the same time, the necessary quantity of coal directly into the bath by means of which it can be used immediately. Oxygen is also introduced at the top of the vessel 40 via a slit 73.

We claim:

1. A method of operating a metallurgical furnace having a given pressure existing therein, said method comprising the steps of providing a pulverizer vessel having an interior, feeding solid fuel to said pulverizer vessel interior, projecting a plurality of streams of gaseous medium into said pulverizer vessel interior, pulverizing the fuel to an ultrafine particle size in said pulverizer vessel, by interparticle collision of said solid material in said at least one stream of gaseous medium introduced into the pulverizer at a pressure significantly in excess of said given pressure existing in the metallurgical furnace, and feeding the ultrafine pulverized fuel directly and continuously from the pulverizer vessel to the furnace solely under the action of said gaseous medium.

2. A method according to claim 1, wherein said furnace is a blast furnace having tuyeres, said method comprising the steps of feeding ultrafine pulverized fuel and gaseous medium directly and continuously from the pulverizer via the tuyeres of the blast furnace.

3. A method according to claim 1, wherein said furnace is an electric arc furnace, said method comprising the steps of operating the furnace so as to form a bath of molten metal in at least the lower part of the furnace, said bath having an upper surface, and feeding the ultrafine pulverized fuel and gaseous medium directly and continuously from the pulverizer into the bath of molten metal, below the upper surface thereof, whereby the bath is agitated by the introduction of said gaseous medium thereinto and the ultrafine pulverized fuel reacts chemically with the molten metal.

4. A method according to claim 1, comprising the steps of providing small bore injectors in said tuyers and a centrifugal solid concentrator and positioning said concentrator between the pulverizer and the tuyeres of the furnace, whereby the ultrafine pulverized fuel is fed directly and continuously from the pulverizer vessel through said concentrator, said concentrator being effective to decrease the total volume of material flowing to the tuyeres to provide a concentrated mixture and then injecting the concentrated mixture through said small bore injectors provided in the tuyeres.

5. A method according to claim 4, further comprising the steps of providing a clean gas outlet in the concentrator and passing gaseous medium extracted in the concentrator through said clean gas outlet.

6. A metallurgical furnace apparatus comprising a blast furnace having a main furnace chamber, and tuyeres for feeding air or oxygen to the main furnace chamber, a pulverizer vessel, means for feeding solid fuel particles to the pulverizer vessel, a plurality of nozzles for directing streams of gaseous medium into the vessel, at a pressure significantly in excess of the normal pressure in the main furnace chamber, to produce ultrafine pulverized coal in said vessel, by interparticle collision of said solid fuel particles, and means for feeding the mixture of ultrafine pulverized fuel and gaseous medium directly and continuously from the pulverizer vessel to said tuyeres and thus to the main furnace chamber.

7. Apparatus according to claim 6, wherein the pulverizer vessel includes a plurality of nozzles mounted in an annular array with the nozzles each arranged to point upwardly and at an angle between a radius and a tangent to the annulus.

8. Apparatus according to claim 6, and further comprising a centrifugal concentrator placed in the line between the pulverizer chamber and the tuyeres, the concentrator including an inlet, a solids outlet and a clean gas outlet and means connecting the solids outlet of the concentrator to the tuyeres.

9. Apparatus according to claim 8, and further comprising a valve placed in the clean gas outlet of the concentrator effective to balance the pressures between the clean gas outlet and the solids outlet thereof.

10. Apparatus according to claim 6, wherein the outlet of the pulverizer vessel is connected directly to a lower part of the main furnace chamber so that the bath of molten metal in the main furnace chamber is agitated by the incoming gaseous medium.

11. A metallurgical furnace apparatus comprising an electric arc furnace having a main furnace chamber, said main furnace chamber including a lower portion for retaining a bath of molten material, an electrode positioned in said main furnace chamber above said lower portion, a pulverizer vessel, means for feeding solid fuel particles to the pulverizer vessel, a plurality of nozzles for directing streams of gaseous medium into the vessel at a pressure significantly in excess of the pressure in the main furnace chamber to produce ultrafine pulverized coal in said vessel by interparticle collision of said solid fuel particles, and feed means for feeding the mixture of ultrafine pulverized fuel and gaseous medium directly and continuously from the pulverizer vessel to the main furnace chamber into said lower portion.

* * * * *